(12) United States Patent
Rabinovich (10) Patent No.: US 7,689,023 B2
(45) Date of Patent: Mar. 30, 2010

(54) COLOR UNMIXING AND REGION OF INTEREST DETECTION IN TISSUE SAMPLES

(76) Inventor: Andrew M. Rabinovich, 3874 La Jilla Village Dr., La Jolla, CA (US) 90237

( * ) Notice: Subject to any disclaimer, the term of this patent is extended or adjusted under 35 U.S.C. 154(b) by 1057 days.

(21) Appl. No.: 10/558,679

(22) PCT Filed: May 28, 2004

(86) PCT No.: PCT/US2004/016858

§ 371 (c)(1),
(2), (4) Date: Nov. 30, 2005

(87) PCT Pub. No.: WO2004/111930

PCT Pub. Date: Dec. 23, 2004

(65) Prior Publication Data

US 2007/0053573 A1    Mar. 8, 2007

Related U.S. Application Data (60) Provisional application No. 60/475,071, filed on May 30, 2003.

(51) Int. Cl.
*G06K 9/00* (2006.01)
(52) U.S. Cl. ...................... 382/133; 382/128
(58) Field of Classification Search ................. 382/133, 382/128; 702/28
See application file for complete search history.

(56) References Cited

U.S. PATENT DOCUMENTS 5,583,951 A    12/1996    Sirat et al.
5,995,645 A    11/1999    Soenksen et al.
6,675,106 B1    1/2004    Keenan et al.

OTHER PUBLICATIONS

Malik, J. et al. "Textons, contours and regions: cue integration in image segmentation", The Proceedings of the Seventh IEEE International Conference on Computer Vision, 1999. vol. 2, Sep. 20-27, 1999 pp. 918-925.*
Lee, D.D. et al. "Learning the parts of objects with nonnegative matrix factorization". Nature, 401:788-791, 1999.*
Arnout C. Ruifrok and Dennis A. Johnston. Quantification of histochemical staining by color deconvolution. Analyt Quant Cytol Histol, 23:291-299, 2001.*
T.-W. Lee, T. Wachtler, and T. Sejnowski. Color opponency is an efficient representation of spectral properties in natural scenes. Vision Research, 42(17):2095-2103, 2002.*
Domnisoru, et al. "Filtering Technique for Fluorescense-Based DNA Sequencing Data", *IEEE*, pp. 489-493, (Jul. 2000).

\* cited by examiner

*Primary Examiner*—Samir A. Ahmed
*Assistant Examiner*—Li Liu
(74) *Attorney, Agent, or Firm*—The Nath Law Group (57) ABSTRACT

In a method and system and machine-readable medium, colors in an image (200) are unmixed (202) using a matrix X=AS, where A is a $n_s \times n_d$ matrix of spectral definitions, where $n_s$ is the number of spectral components and $n_d$ is the number of dyes into which the image is decomposed, and where S is a $n_d \times 1$ matrix of amounts of each dye at every pixel, where l is the number of pixels; the matrix X is constrained for solution by an unsupervised matrix decomposition method having constraints consistent with properties of an additive color model; and $n_d$ is determined. A texture is determined to identify areas of interest. Further processing may automatically measure cell dye concentration in the determined regions of interest.

17 Claims, 4 Drawing Sheets

COLOR UNMIXING AND REGION OF INTEREST DETECTION IN TISSUE SAMPLES

CROSS REFERENCE TO RELATED APPLICATIONS

The present application claims priority from U.S. Provisional Patent Application 60/475,071 filed May 30, 2003, the disclosure of which is incorporated by reference herein.

FIELD OF THE INVENTION

The present subject matter relates to processes, systems, and apparatuses for performing deconvolution of colors in an image and automated analysis of areas of interest in a non-uniform sample.

BACKGROUND OF THE INVENTION

One form of tissue analysis comprises staining tissue with a dye and placing this stained tissue on a microscope slide. The tissue may be stained with more than one dye for a number of different reasons. For example, two dyes may be used to identify the presence of two different proteins. In another application, one dye may be specific to bind with a particular cell component such as cytoplasm, while the other dye may stain nuclei. The microscope slide is then illuminated and an electronic image is produced. A digital video image of stained tissue may be produced. Pixels in the image have color components. In order to derive separate signals, each indicative of level of a different color in the image, the video signal must be "unmixed." Various statistical methods may be used to process the color components to obtain indications of color in the image. These indications must then be further processed to provide information of interest. Manual processing of the information has been provided by having a pathologist review and evaluate the slide. Automated analysis has also been provided for certain forms of slide evaluation but not others.

U.S. Pat. No. 6,631,203 shows a charge coupled device (CCD) camera providing an image of a stained slide to an image processor.

U.S. Pat. No. 5,995,645 discloses a method for cancer cell detection including the steps of staining an analyzed sample with at least first and second dyes, the dyes being selected such that the first dye better adheres to normal cells whereas the second dye better adheres to cancer cells; spectrally imaging the sample through an optical device being optically connected to an imaging spectrometer, thereby obtaining a spectrum of each pixel of the sample; based on the spectra, evaluating concentrations of the first and second dyes for each of the pixels in an image; and based on the concentrations detecting the presence of cancer cells in the sample.

U.S. Pat. No. 6,665,438 discloses unmixing hyperspectral imagery data using a genetic algorithm and robust Kalman filtering techniques, in a pixel by pixel fashion, until a hyperspectral image cube is completed.

U.S. Pat. No. 6,728,396 relates generally to statistical signal processing and its application to imaging, and more particularly to a method and/or associated apparatus for independent component imaging from mixed observations. The statistical and/or neural computation technique of Independent Component Analysis (ICA) is used for separating hidden sources from mixed image signals.

U.S. Pat. No. 6,697,509 discloses an imager used to generate an image of a sample, e.g., a tissue sample including diaminobenzidine tetrahydrochloride (DAB) stained cells. A user selects a region to be scored in the image. A mean intensity value of a selected color is determined from the pixels in the selected region. The selected color may be the complement of a color to be scored, which, in the case of a DAB test, is blue. A score is generated in response to the mean intensity value using a stored calibration curve.

U.S. Pat. No. 6,675,106 discloses a method of determining the properties of a sample from measured spectral data collected from the sample by performing a multivariate spectral analysis. The method can include generating a two-dimensional matrix A containing measured spectral data; providing a weighted spectral data matrix D by performing a weighting operation on matrix A; factoring D into the product of two matrices C and $S^T$, by performing a constrained alternating least-squares analysis of $D=CS^T$, where C is a concentration intensity matrix and S is a spectral shapes matrix; unweighting C and S by applying the inverse of the weighting used previously; and determining the properties of the sample by inspecting C and S.

U.S. Pat. No. 6,427,126 discusses an advanced imaging spectrograph system and method for very high throughput identification, sequencing and/or genotyping of DNA and other molecules. The system is based on the integration of improved electrophoresis structures with an imaging spectrophotometer that records the entire emission spectra along an imaging line across a sequencing gel (or capillary array). The system includes spectral shape matching to improve dye identification allowing the use of dyes having nearly any emission spectra and allowing greater than four-dye multiplexing.

U.S. Pat. No. 6,151,414 discloses a code utilizing an n×p signal matrix which is factored into matrices whose entries are non-negative.

There is nowhere disclosed in the known prior art an arrangement directed to automatic color unmixing in an image of a slide having tissue stained by a first, non-specific dye and by a second, immunohistochemical dye having a color differing from that of the first dye. The immunohistochemical dye could, for example, be specific to cancer cells. The prior art further does not disclose analyzing the image in the spectrum of the immunohistochemical dye for areas of interest, e.g. organs as opposed to stroma (for example fatty or other intermediate tissue). Further, the prior art does not disclose normalizing the color concentration of the second dye with respect to an area of interest to generate a color index having diagnostic significance.

SUMMARY OF THE INVENTION

Briefly stated, the present subject matter relates to a method and apparatus for spectral decomposition comprising:
  accessing an image comprising pixels;
  creating a matrix X=AS;
  constraining the matrix X for solution by an unsupervised matrix decomposition method having constraints consistent with properties of additive color model; and
  determining $n_d$.

In an alternative embodiment, the present subject matter relates to a programmed medium which, when executed on a processor, will perform the steps of:
  accessing an image comprising pixels;
  constraining the matrix X for solution by an unsupervised matrix decomposition method having constraints consistent with properties of additive color model; and
  determining $n_d$.

Each pixel comprising the image accessed according to this method, apparatus, and programmed medium contains spectral data. Additionally, in the matrix X, A is a $n_s \times n_d$ matrix of spectral definitions where s is the number of spectral components and d is the number of dyes in to which the image is decomposed; and S is a $n_s \times l$ matrix of amounts of each dye at every pixel, where l is the number of pixels. Further forms of this method, apparatus, and programmed medium are provided herein, where further processing is performed to automatically provide measurements of cell dye having diagnostic significance.

In addition to the various aspects of varying embodiments of the present subject matter described in the Summary herein, other aspects of the present subject matter, or preferred embodiments thereof, will be from the following description. This Summary is neither exhaustive nor intended to be determinative of the scope of the present subject matter.

BRIEF DESCRIPTION OF THE DRAWINGS

The means by which the present subject matter is achieved are pointed out in the following description taken in connection with the following drawings.

DETAILED DESCRIPTION

Figure 1:
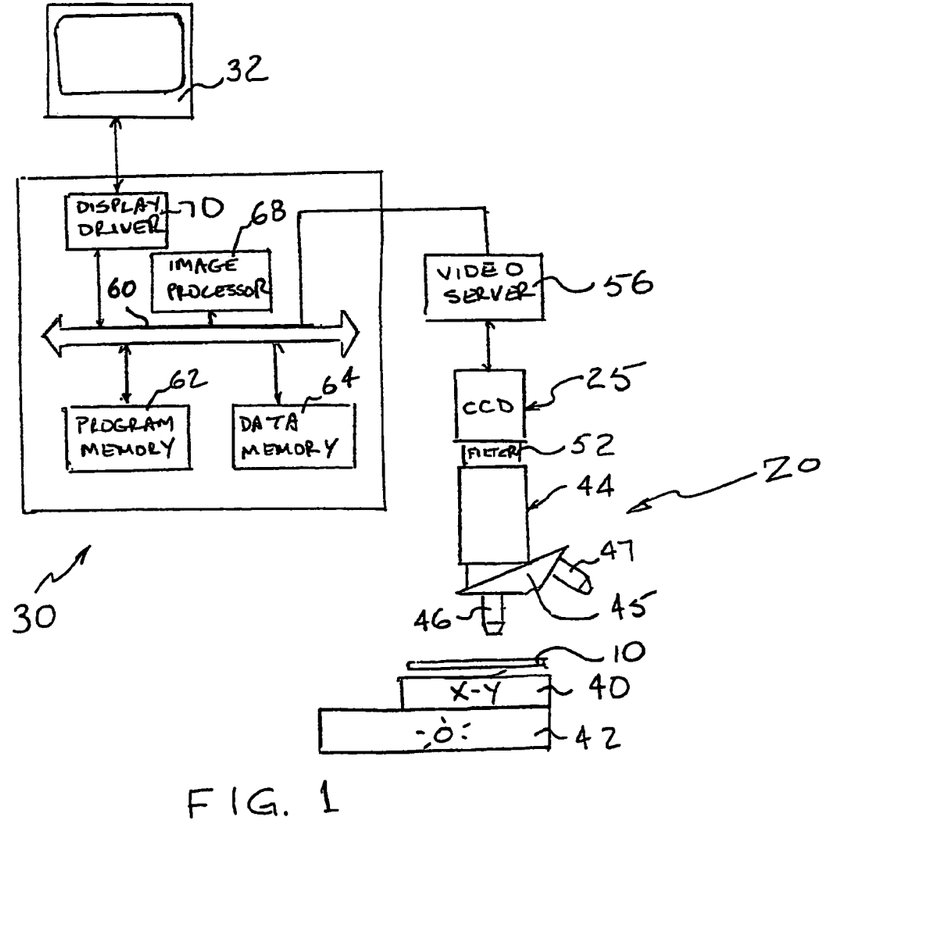
FIG. 1 is a block diagram of a system incorporating embodiments of the present subject matter and for producing and analyzing an image of a histological slide.

FIG. 1 is a block diagram illustrating a system for producing images of a slide 10 having mixed colors and analyzing the images to provide deconvoluted images in which colors are unmixed. One color may be used simply for improved visibility of all tissue in the slide, while the other color may bind to protein in tissue affected by a particular disease. The slide 10, which holds a tissue sample, is further described with respect to FIG. 2 below. The system of FIG. 1 includes a microscope 20, a camera 25 and a computer 30 which may have a monitor 32.

In the microscope 20, the slide 10 is supported on an X-Y stage 40. The X-Y stage 40 includes a platform that is movable in two degrees of freedom so that an operator, e.g. a pathologist, can view selected areas of the slide 10. Commonly, an illumination source 42 is located beneath the X-Y stage 40. The illumination source 42 is a white source that will have a broad spectrum of component wavelengths. The slide 10 is viewed by a focus stage 44 that includes a turret 45. The turret 45 includes a plurality of objective lenses, e.g. 46 and 47, each providing a selected level of magnification. In one preferred form, the objective lens 46 is a 20×, 0.95 NA Flour Nikon objective lens In a preferred embodiment, hyperspectral imaging is used since this is a highly accurate means of providing raw color data to the camera 25. Hyperspectral imaging, also referred to as imaging spectrometry, differs from conventional remote sensing in that it covers a plurality of defined spectral channels. In this regard, a number of narrow spectral channels each with a particular width are defined using a hyperspectral imaging system. In contrast, conventional imaging looks at broadly defined spectral regions. In a preferred embodiment herein, three channels are utilized. In alternative preferred embodiments herein, nine channels or a larger number of channels may be used. Channels are established using a filter unit 52. In a preferred embodiment, the filter unit 52 is located between the microscope 20 and the camera 25. The filter unit 52 could alternatively be located, for example, between the illumination source 42 and the slide 10. The filter unit 52 includes a 605 nm high pass filter, a 505 nm low pass filter and 500-570 nm band pass filter to form a stack with three layers. The "cutoff" wavelengths for each filter represent a 50% power level reduction.

The camera 25 comprises a charge coupled device (CCD) camera providing an output to the computer 30. The camera 25 provides an output comprising an array of pixels. A video server 56 processes outputs of the camera 25 and couples data to the computer 30. Alternatively, processing may be accomplished in the computer 30. The computer 30 comprises a data bus 60 through which various components communicate. The computer 30 comprises a program memory 62, data memory 64 and an image processor 68. The bus 60 also communicates with a display drive 70 coupled to the monitor 32. The various components need not be embodied physically in discrete components. Various functions may be combined in different subunits of commercially available processor chips. There are many different well-known ways of representing components within computers that perform the same functions.

Figure 2:
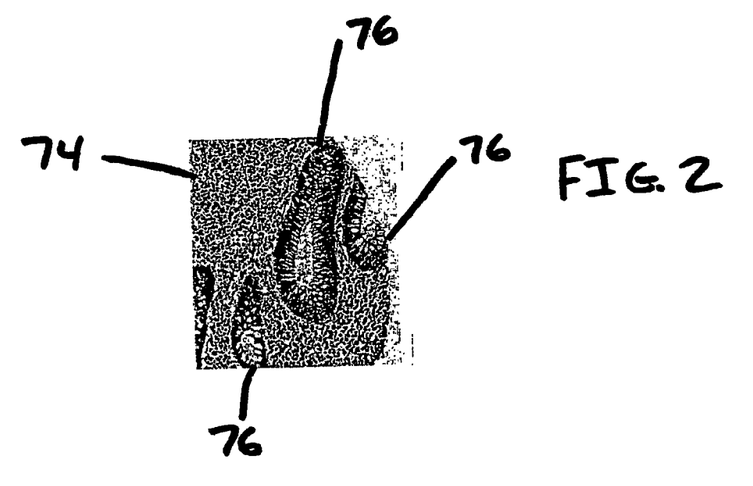
FIG. 2 is an illustration of a slide stained with a non-specific dye and an immunohistochemical dye, each dye having a different color.

FIG. 2 illustrates an image of a tissue sample on a slide 10. The tissue includes stroma 74 and component tissue 76. Stroma includes fatty tissue and connective tissue whose spectral distribution will not be of significant diagnostic significance. Component tissue is used here to describe an organ or other differentiated structure. In a preferred embodiment, the present subject matter is used to analyze tissue that has been stained with at least two dyes and in which one dye provides color data of diagnostic significance. Commonly, the diagnostically significant dye will be immunohistochemical, i.e., it will bind to particular receptors. Other forms of dye could be utilized. In a preferred embodiment, a first dye used is hermatoxylin. This provides a blue stain which is non-specific and makes all tissue more visible. A second dye is a specific dye that binds with tissue affected by a disease. In a preferred embodiment, the second dye is diaminobenzidene (DAB). This is an immunohistochemical dye having a brown color which binds with certain proteins of interest. More particularly, DAB will bind with protein in component tissue affected by cancer.

Figure 3:
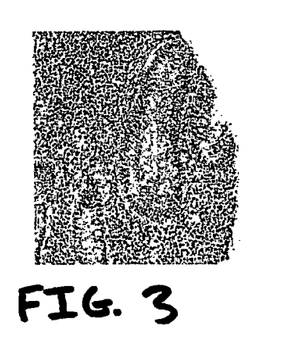
FIGS. 3 and 4 are views of "unmixed" color components of the non-specific dye and an immunohistochemical dye respectively obtained in a first embodiment of the present subject matter.
Figure 4:
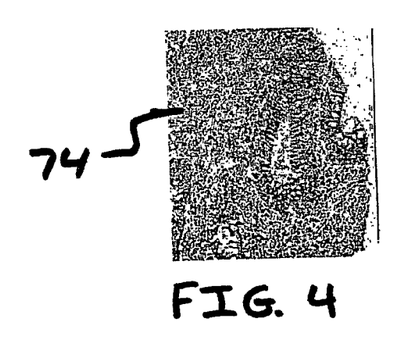
Figure 5:
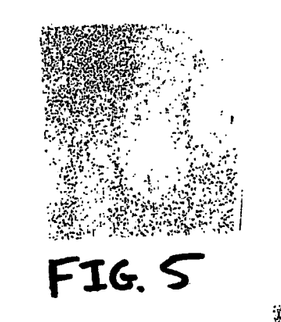
FIGS. 5, 6, and 7 are, respectively, decomposed images of FIG. 2 in first and second colors and a representation of unstained tissue.
Figure 6:
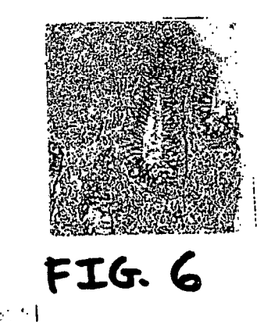
Figure 7:
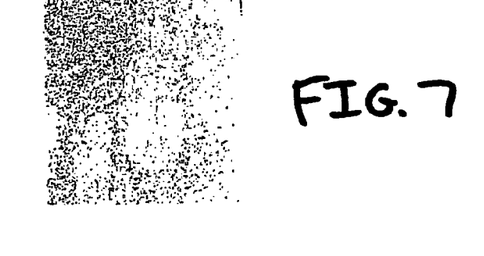

When the image of the slide 10 is viewed, the blue and brown colors are mixed. However, only the degree of brown staining will have diagnostic significance. Therefore, it is important to unmix, or deconvolute, the component images of the respective dyes in the image. Therefore, in a manner further described below, a preferred embodiment of the present subject matter is used to separate the slide 10 into images in FIGS. 3 and 4 corresponding to the colors of the hermatoxylin and DAB dyes, respectively. In another form, the images of FIGS. 5, 6 and 7 are produced which correspond to blue, brown and unstained components of the image of FIG. 2. The deconvoluted images provide for brown images (FIGS. 4 and 6) that can be evaluated by an operator.

It is also important to provide for automated analysis of a slide 10 to provide an indication of the degree of brown staining of a tissue sample. Automation is provided at at least two levels. First, it is desirable to make separate images in colors corresponding to each dye automatically. A current approach to this separation is called Color Deconvolution and is described in J. H. Price, E. A. Hunter and D. A. Gough, "Quantification of Histochemical Staining by Color Deconvolution", *Analyt. Quant. Cytol. Histol.*, 23:291-299, 2001, the entire contents of which is hereby incorporated by references. This technique requires manual interaction of an operator with an image. A user must view an image and manipulate a computer mouse.

Figure 8:
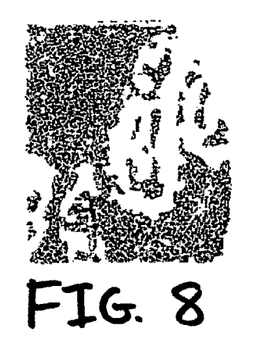
FIGS. 8 and 9 illustrate separation of the image of FIG. 4 into images representative of stroma and specific tissue to which immunohistochemical dye has bound.
Figure 9:
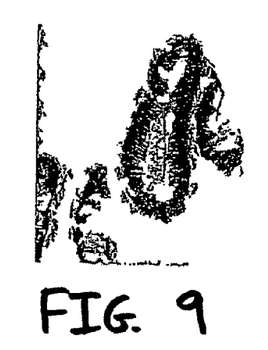
Figure 10:
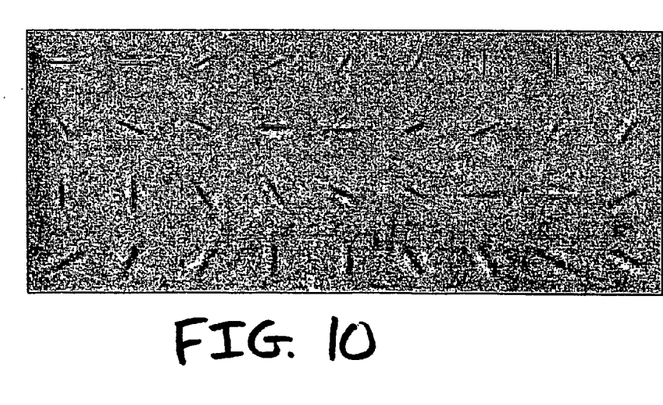
FIGS. 10 and 11 illustrate a spatial filter useful in producing the separation of FIGS. 8 and 9 from the image of FIG. 4.
Figure 11:
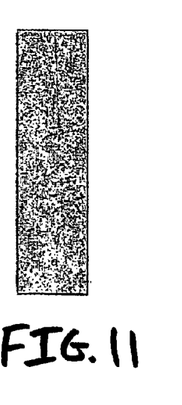

At a second level, it is desirable to generate an output indicative of the presence of disease without intervention by a pathologist viewing the slide 10. As seen in FIGS. 4 and 6, brown stain will be dispersed through the stroma 74. The brown stain in the stroma 74 does not have material diagnostic significance. It is desirable to provide for automated processing of significant color data. To this end, it is important to provide the image separation illustrated in FIGS. 8 and 9. FIG. 8 represents stroma 74 and FIG. 9 represents specific tissue 76. The filter of FIG. 10 is utilized as a tool to convolve images with the illustrated bank of lineal spatial filters turned to various orientation and spatial frequencies. FIG. 11 illustrates scales of center-surround filters.

Spectral profiles of each dye used herein commonly are not aligned with individual spectral bands. Therefore, simple filtering will not detect staining due to each dye. Spectral profiles of dyes tend to overlap and extend over a plurality of spectral bands. The number of spectral channels used is referred to as $n_s$, and the number of dyes used is referred to as $n_d$. In the present example, $n_s=3$ and $n_d=2$. Unmixing of dyes is accomplished using a matrix of the form:

$$X = AS \quad (1)$$

wherein X is an $n_s \times l$ column matrix, where l is the number of pixels provided by the camera 25 and the entry $X_{ij}$ is the brightness of the ith pixel in the image in the jth spectral band;

A is a $n_s \times n_d$ matrix of spectral definitions; and

S is an $n_d \times l$ matrix of amounts of each dye at every pixel, with the entry $S_{ij}$ indicating the contribution of the ith dye to the jth pixel.

In accordance with preferred embodiments of the present subject matter, an unsupervised color unmixing matrix solution, or matrix decomposition method, is selected. For purposes of the present description herein, an unsupervised decomposition method is one that allows automated unmixing of the matrix. The unsupervised solution has constraints which are consistent with the spectral components to be processed. In the present illustration, the colors to be unmixed are produced by dyes. Therefore, constraints must be consistent with additive color. Since the first and second dyes are not constrained to have any particular spectral relationship to each other, an unsupervised method cannot assume or require a particular relationship of the colors within the first and second dyes.

It has been found in accordance with preferred embodiments of the present subject matter herein that unsupervised matrix decomposition methods include Non-Negative Matrix Factorization (NMF) and Independent Component Analysis (ICA). The constraints required for each of these methods are consistent with the spectral parameters that will be encountered. NMF requires that there is a non-negative response to each dye. The staining and imaging processes are consistent with these constraints.

The ICA method is based on a constraint that the image data generated is a result of superpositioning of a number of stochastically independent processes. In the case of histological staining, this corresponds to an assumption that each dye stains tissue independently of all other dyes. This constraint is also complied with.

In performance of the NMF solution in one form, X is factored in to A and S such that:

$$[A, S] = \underset{A,S}{\operatorname{argmin}} \lVert X - AS \rVert \text{ subject to } A_{ij} > 0; S_{ij} > 0 \quad (2)$$

The above equation is underconstrained; it has a scale ambiguity. Given a solution [A, S] of the above equation, [α A, S/α] for α≠0 is also a solution to this problem. Ambiguity is avoided by constraining each column of A to have unit norm. This does not affect the matrix solution, since only the proportion of each stain is needed; the exact intensity of the constituent dye is not important.

The choice of a norm, described in the following citation, decides the particular algorithm used for performing the deconvolution. An algorithm has been implemented for recovering the non-negative factorization of a matrix in accordance with a method further articulated in D. D. Lee and H. S. Seung, "Learning the Parts of Objects With Non-Negative Matrix Factorization", *Nature*, 401:788-791, 1999, the entire contents of which are hereby incorporated by reference, using the $L_2$ norm as a measure of error. Using this method, the image of FIG. 2 was unmixed into the images of FIGS. 3 and 4 respectively representing the images in the spectra of the blue dye and the brown dye.

ICA is based on a generative view of the data, where the data is assumed to be a result of superpositioning a number of stochastically independent processes. In the case of histological staining, this corresponds to assuming that each dye stains the tissue independently of all other dyes. The rows of the matrix S represent the individual stochastic processes and the columns of A indicate their interactions. In a preferred form, a Joint Approximate Diagonalization of Eigenmatrices (JADE) algorithm was used to recover the independent components of X. This algorithm calculates the ICA decomposition of X by calculating the eigenvalue decomposition of the cumulant tensor of the data. The eigenvalues of cumulant tensor are vectors corresponding to the independent components of the mixture. In one application, the matrix was constructed using $n_s=3$ and $n_d=3$. The deconvoluted images of FIGS. 5, 6 and 7 were thus obtained respectively corresponding to blue, brown and unstained images.

One known method for decomposing a matrix is Principal Component Analysis (PCA). This method assumes that the parameters being unmixed are orthogonal. An example of a pair of orthogonal colors is red and blue. In applications using embodiments of the present invention, dye colors are generally unrelated. Therefore, PCA is not an unsupervised matrix decomposition method useful in the present embodiments.

The images of FIGS. 4 or 6, having been automatically generated, can be studied by a pathologist. In a further form, the image in the spectrum of the immunohistochemical dye is automatically analyzed. Areas of interest are located. Then, based on image analysis, a value is produced which has diagnostic significance. In a preferred form, areas of specific tissue 76 are separated from stroma 74 since amounts of brown dye retained in the stroma 74 will not have diagnostic significance. The amount of brown dye sensed per pixel is summed and then normalized with respect to image area. A value is calculated to provide an indication of diagnostic significance. One value that may be provided is percentage of saturation of brown in an image. This will correlate to the amount of diseased tissue binding to the dye. A protocol may be set up under which images scoring at least a threshold level percentage are referred to a pathologist for further attention.

The set of filters in FIG. 10 comprises a filter bank including filter kernels $f_1$ having even and odd phases of six orientations and four scales evenly spaced from zero to $\pi$ radians. In the present illustration, there are 40 filter kernels. Alternative filter banks having an alternative number of filter kernels could be utilized. These include filter banks of Gaussian derivatives or Gabor functions. The oriented filter bank used in this approach, depicted in FIG. 10, is based on rotated copies of a Gaussian derivative and its Hilbert transform. More precisely, $f_1(x,y) = G''\sigma_1(y)G'\sigma_2(x)$ and $f_2(x,y)$ equals the Hilbert transform of $f_1(x,y)$ along the y axis:

$$f_1(x, y) = \frac{d^2}{dy^2}\left(\frac{1}{C}\exp\left(\frac{y^2}{\sigma^2}\right)\exp\left(\frac{x^2}{l^2\sigma^2}\right)\right) \quad (3)$$

$$f_2(x, y) = \text{Hilbert}(f_1(x, y))$$

where $\sigma$ is the scale, l is the aspect ratio of the filter, and C is a normalization constant. (The use of the Hilbert transform instead of a first derivative makes $f_1$ and $f_2$ an exact quadrature pair.) The radially symmetric portion of the filter bank consists of difference-of-Gaussian kernels. Each filter is zero-mean and $L_1$ normalized for scale invariance Shapes and sizes of elements in the image are detected in this regard. Variation in sizes of elements determines a texture. The mean size of all elements is chosen to define the size, i.e., area, of an image patch, which may also be referred to as a texture neighborhood area. A texture neighborhood is a collection of textons. A texton is a linear combination of some number of filter responses where the combination is determined by statistical clustering, for example K-means. The filter responses are the result of convolving pixel neighborhoods with the filter bank. A pixel neighborhood is a window around each pixel. The window may be, for example in preferred embodiments, 5×5 or 9×9 pixels. Adjacent pixel neighborhoods overlap. Pairwise texture similarities will be computed by comparing windowed texture element histograms. A window W(i) for a generic pixel i is defined as the axis-aligned square of radius $\alpha(i)$ centered on pixel i.

Each histogram has k bins, one for each texture channel (each filter response). The value of the kth histogram bin for a pixel i is found by counting how many pixels in texture element channel k fall inside the window W(i). Thus the histogram represents texture element frequencies in a local neighborhood. This is expressed as:

$$h_i k = \sum_{j \in W(i)} I[T(j) = k]i \quad (4)$$

where $I[\cdot]$ is the indicator function and T(j) returns the texture element assigned to pixel j.

Each pixel in the image can be described with a histogram of filter responses within a given image patch (texture neighborhood). By comparing the histograms of a pixel in a given area of an image to the histograms of the rest of the pixels in the image, one can evaluate the similarity between the pixel neighborhoods centered on each pixel. There are various known techniques for empirical comparison of texture similarity. A preferred embodiment in this regard uses a $\chi^2$ test, defined as:

$$\chi^2(h_i, h_j) = \frac{1}{2}\sum_{k=1}^{K} \frac{[h_i(k) - h_j(k)]^2}{h_i(k) + h_j(k)}$$

where $h_i$ and $h_j$ are the two histograms.

If histograms $h_i$ and $h_j$ are very different, $\chi^2$ is very large. Thus, image patches with similar $\chi^2$ values will have similar textures. Alternatively, one can use a different similarity measure. For example, texture histograms can be considered as probability distribution functions and may be compared using the Kolmogorov-Smirnov distance. Provided that $\chi^2$ values are computed for the entire image, and there are various textures in the image (stroma, glands), the values of $\chi^2$ can be thresholded to label the different textures in the image. Statistical clustering techniques such as K-means can also be applied to find regions of distinct textures. An example of these methods applied to separating stroma and glandular tissue is shown in FIGS. 2, 8 and 9. The mean grayscale image computed from a 3-channel (RGB) image was used to test the filter bank shown in FIG. 10. The results are promising. Given that an existing filter not specifically designed for this application was used, this technique shows considerable promise for segmentation of histological images.

Provided that $\chi^2$ values are computed for the entire image of FIG. 2, for example, and there are various textures in the image, a comparison may be provided to compare $\chi^2$ to a threshold level to provide an output indicative of different textures in the image. Alternatively, statistical clustering techniques such as K-means are used to find regions of distinct textures. The image processor 68 utilizes the comparison values thus obtain to generate the images of FIGS. 8 and 9 by assigning a pixel to the stroma image or specific tissue image based on the $\chi^2$ value or other comparison measure, which is indicative of relative texture.

For the image of FIG. 9, for example, which represents the brown image, the sum of values of the brown level in each pixel level is produced and normalized. Normalization may be with respect to the number of pixels in the image.

Figure 12:
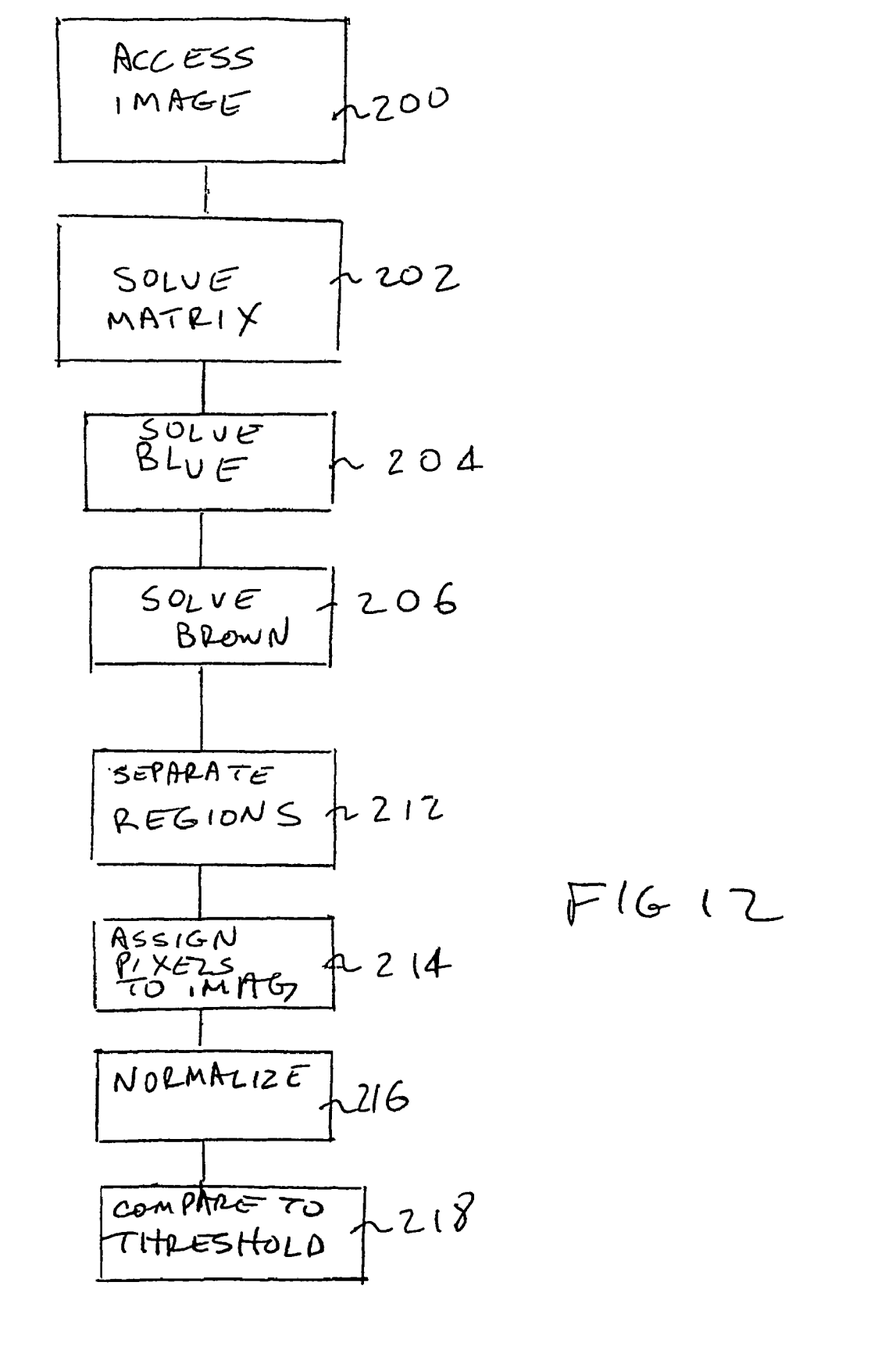
FIG. 12 is a flow chart illustrating a method and performance of a machine-readable medium in accordance with embodiments of the present subject matter.

Performance of the method and apparatus of the present subject matter is described with respect to the flow chart of FIG. 12. FIG. 12 also represents a machine-readable medium which may provide instructions to the computer 30 of FIG. 1. A machine-readable medium includes any mechanism that provides, i.e., stores and/or transmits information in a form readable by a machine, e.g. a computer. For example, a machine-readable medium includes read only memory (ROM); random access memory (RAM); magnetic disk storage media; optical storage media; flash memory devices; and electrical, optical, acoustical or other form of propagated signals, for example.

Referring now to FIG. 12, at block 200, the computer 30 (FIG. 1) accesses a video image. The image may be provided by a video server 52, the camera 25 or be accessed from data memory 64. At block 202, the image processor 68 utilizes an unsupervised matrix deconvolution function to provide $n_d$ images, one for each dye utilized. The images are produced as indicated at blocks 204 and 206. However, this illustration is not meant to suggest that this order is necessary. The order may be reversed, or the program may operate so that there is no order or the order is not known. The automated deconvolution is complete at this point.

In a further form, the operation proceeds to block 212 at which areas of interest are determined, e.g., the areas of specific tissue 76. As indicated at block 214, based on the above-described comparison analysis, pixels are assigned to an image indicate of stroma 74 or specific tissue 76. At block 216, normalization of a color level in an image of areas of interest is performed to produce a value of diagnostic significance such as percentage or other index of the degree of color in the area of interest. At block 218, the value is compared to a threshold. Block 220 is a decision block at which a flag, report or other indication is provided if the value meets the threshold.

Preferred embodiments of the present subject matter provide for automatic deconvolution of mixed stains produced by one dye that is specific for a condition and another that is used for another purpose, such as general visibility of all tissue in a slide. Further automatic determination is provided in analyzing the level of dye in areas of interest and producing a value of diagnostic significance.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

What is claimed is:

1. A method of spectral decomposition comprising computer-executed steps of:
    accessing an image comprising pixels, each pixel containing spectral data;
    creating a matrix X=AS, where A is a $n_s \times n_d$ matrix of spectral definitions, where $n_s$ is the number of spectral components and $n_d$ is the number of dyes into which the image is decomposed, and where S is a $n_d \times l$ matrix of amounts of each dye at every pixel, where l is the number of pixels;
    constraining the matrix X for solution by an unsupervised matrix decomposition method having constraints consistent with properties of additive color model; and
    using the constrained matrix X to produce at least one image for at least one dye of the number of dyes.

2. A method according to claim 1 further comprising resolving areas of interest in a first color.

3. A method according to claim 2 further comprising determining a level of a second color in pixels in said areas of interest.

4. A method according to claim 3 further comprising normalizing a total value of said second color in said pixels in said areas of interest and providing a value indicative thereof.

5. A method according to claim 1 wherein said unsupervised matrix decomposition method comprises non-negative matrix factorization such that both matrices A and S are restricted to be non-negative.

6. A method according to claim 1 wherein said unsupervised matrix decomposition method comprises independent component analysis such that statistical independence of columns of said matrix A is maximized.

7. A method according to claim 2 wherein resolving said areas of interest comprises applying oriented spatial filters to said image in said first color.

8. A method according to claim 7 further comprising grouping outputs of said filters into textons.

9. A method according to claim 8 wherein resolving said areas of interest further comprises generating a histogram for each pixel, said histogram comprising responses from neighboring pixels within an image patch and comparing similarity between neighborhoods centered on each pixel.

10. A method according to claim 9 wherein comparing comprises generating a value for said image patch indicative of similarity to a next image patch.

11. A method according to claim 10 where generating a value indicative of similarity comprises generating a $x^2$ value.

12. A method according to claim 8 further comprising separating from a deconvoluted image an image of said area of interest based on having similar texture within a predetermined range.

13. An device for spectral decomposition comprising:
    a video processor to receive an input indicative of an image comprising pixels, each pixel containing spectral data;
    said processor adapted to create a matrix X=AS, where A is a $n_s \times n_d$ matrix of spectral definitions, where $n_s$ is the number of spectral components and $n_d$ is the number of dyes in to which the image is decomposed, and where S is a $n_d \times l$ matrix of amounts of each dye at every pixel, where l is the number of pixels; to constrain the matrix X for solution by an unsupervised matrix decomposition method having constraints consistent with properties of an additive color model; and to produce at least one image for at least one dye of the number of dyes using the constrained matrix X.

14. A device according to claim 13 wherein said processor further comprises a spatial filter to determine areas of interest in a first color.

15. A device according to claim 14 further comprising means to determine similarity of adjacent image patches and to create a separate image for areas having a texture indicative of tissue whose level of the first color is of diagnostic significance.

16. A device according to claim 15 further comprising means to sum and normalize the level of the first color with respect to an area of the separate image.

17. A device according to claim 16 further comprising a comparison circuit to compare the normalized level of the first color to a threshold.

* * * * *

UNITED STATES PATENT AND TRADEMARK OFFICE
CERTIFICATE OF CORRECTION

PATENT NO. : 7,689,023 B2  Page 1 of 1
APPLICATION NO. : 10/558679
DATED : March 30, 2010
INVENTOR(S) : Andrew M. Rabinovich It is certified that error appears in the above-identified patent and that said Letters Patent is hereby corrected as shown below:

Column 10, Claim 13, Line 34
Please delete "in to"
and replace with -- into --

Signed and Sealed this

Eighteenth Day of May, 2010

David J. Kappos
*Director of the United States Patent and Trademark Office*